United States Patent [19]

Den Hartog et al.

[11] Patent Number: 5,635,145
[45] Date of Patent: Jun. 3, 1997

[54] MULTI-BED DOWNFLOW REACTOR

[75] Inventors: Arie P. Den Hartog; Willem Van Vliet, both of The Hague, Netherlands

[73] Assignee: Shell Oil Company, Houston, Tex.

[21] Appl. No.: 504,296

[22] Filed: Jul. 20, 1995

[30] Foreign Application Priority Data

Aug. 23, 1994 [EP] European Pat. Off. ............ 94202412

[51] Int. Cl.$^6$ .................................................. B01J 8/04
[52] U.S. Cl. .................. 422/191; 422/194; 422/195; 422/220; 422/224; 239/558; 261/97
[58] Field of Search ........................... 422/191, 194, 422/195, 216, 220, 224; 239/558; 261/97

[56] References Cited

U.S. PATENT DOCUMENTS

| | | | |
|---|---|---|---|
| 3,378,349 | 4/1968 | Shirk | 422/195 |
| 3,502,445 | 3/1970 | Ballard et al. | 422/195 |
| 3,524,731 | 8/1970 | Effron et al. | 422/195 |
| 3,592,612 | 7/1971 | Ballard et al. | 422/195 |
| 3,787,189 | 1/1974 | Muffat et al. | 422/195 |
| 3,855,068 | 12/1974 | Lieberman | |
| 3,977,384 | 8/1976 | Alcock et al. | 422/195 |
| 4,378,292 | 3/1983 | Haase | 210/266 |
| 4,836,989 | 6/1989 | Aly et al. | |
| 4,960,571 | 10/1990 | Bhagat et al. | 422/194 |
| 5,013,407 | 5/1991 | Nocca et al. | 202/158 |
| 5,403,560 | 4/1995 | Deshpande et al. | 422/190 |
| 5,462,719 | 10/1995 | Pedersen et al. | 422/195 |

FOREIGN PATENT DOCUMENTS

| | | |
|---|---|---|
| 207673 | 7/1987 | European Pat. Off. . |
| 427733 | 5/1991 | European Pat. Off. . |
| 1486678 | 6/1967 | France . |

*Primary Examiner*—Nina Bhat
*Attorney, Agent, or Firm*—Kim Muller

[57] ABSTRACT

Multi-bed downflow reactor for the catalytic conversion of a liquid and/or a gas including a chamber arranged in between adjacent catalyst beds, which chamber includes a) at least one device for injecting an additional liquid and/or gas for controlling the temperature in the reactor, b) a collecting tray for receiving liquid, c) a compartment for receiving gas, d) a mixing zone for mixing liquid and gas, and e) a distribution tray comprising passages allowing liquid and gas to pass downwardly over an adjacent catalyst bed, whereby the collecting tray is arranged downstream of the device(s) for injecting the additional liquid and/or gas and comprises guiding channels directing liquid downwardly into a central part of the mixing zone, the compartment is arranged upon the collecting tray and comprises at least one passage allowing gas to pass downwardly, and the mixing zone is arranged in between the collecting tray and the distribution tray.

3 Claims, 1 Drawing Sheet

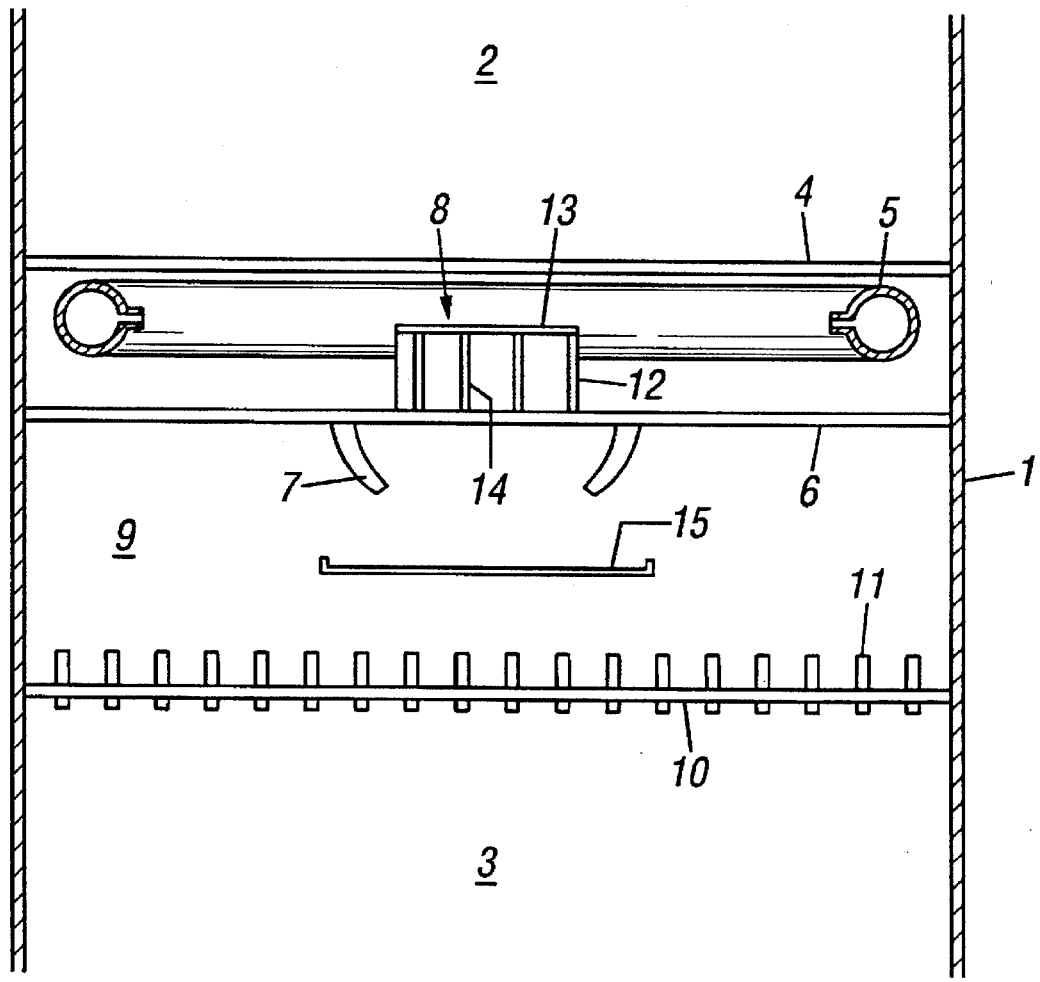

MULTI-BED DOWNFLOW REACTOR

I. FIELD OF THE INVENTION

The invention relates to a multi-bed downflow reactor comprising a particular chamber arranged between adjacent catalyst beds for controlling the temperature in the reactor. The invention further relates to a process for the catalytic conversion of a liquid and/or a gas wherein use is made of the present multi-bed downflow reactor.

II. BACKGROUND OF THE INVENTION

Many reactors used for hydroprocessing of hydrocarbonaceous feedstocks consist of a number of catalyst beds. Because of the exothermic nature of hydroprocessing reactions the reactants are generally cooled between catalyst beds by means of injection of a cold quench medium (a gas or liquid). To this end multi-bed hydroprocessing reactors are provided with quenching chambers which are placed between adjacent beds.

In general the injection of the quench medium will compensate for the exothermic temperature rise over the previous catalyst bed, and the quenching chamber may in addition redistribute the reactants and quenching medium uniformly over the following catalyst bed.

Although a large variety of quench chambers is already known there is still a need to provide a multi-bed reactor with a chamber for controlling the temperature in the reactor having an improved mixing efficiency and an improved uniformity of distribution across the reactor.

An object of the present invention is to provide such a reactor.

III. SUMMARY OF THE INVENTION

Accordingly, the present invention relates to a multi-bed downflow reactor for the catalytic conversion of a liquid and/or a gas comprising a chamber arranged in between adjacent catalyst beds, which chamber comprises a) at least one device for injecting an additional liquid and/or gas for controlling the temperature in the reactor, b) a collecting tray for receiving liquid, c) a compartment for receiving gas, d) a mixing zone for mixing liquid and gas, and e) a distribution tray comprising passages allowing liquid and gas to pass downwardly over an adjacent catalyst bed, whereby the collecting tray is arranged downstream of the device(s) for injecting the additional liquid and/or gas and comprises guiding channels directing liquid downwardly into a central part of the mixing zone, the compartment is arranged upon the collecting tray and comprises at least one passage allowing gas to pass downwardly, and the mixing zone is arranged between the collecting tray and the distribution tray.

IV. BRIEF DESCRIPTION OF THE DRAWINGS

FIG. 1 schematically shows a longitudinal cross-section of part of a multi-bed downflow reactor in accordance with one embodiment of the present invention.

V. DETAILED DESCRIPTION OF THE PREFERRED EMBODIMENTS

An additional advantage of the type of chamber applied in the present multi-bed downflow reactor is its compactness, therewith establishing a significant reduction in the total length of the reactor.

Although the bulk of the liquid and gas will be mixed separately in the mixing zone, some interaction between the liquid and the gas will occur.

Preferably, the chamber comprises a compartment which is substantially centrally arranged upon the collecting tray. The chamber may also comprise a plurality of compartments, e.g. three compartments, which are symmetrically arranged around the vertical axis of the reactor.

Suitably, in the reactor of the present invention the collecting tray and the distribution tray are substantially parallel arranged with respect to each other.

Suitably, the device for injecting the additional liquid and/or gas for controlling the temperature in the reactor is substantially annularly arranged along the inner wall of the reactor.

In another embodiment the device for injecting the additional liquid and/or gas for controlling the temperature in the reactor consists of a plurality of lateral arms extending from a central manifold.

Suitably, the device for injecting the additional liquid and/or gas comprises a series of openings which are substantially horizontally arranged around the vertical axis of the reactor.

Preferably, the reactor in accordance with the present invention comprises between the mixing zone and the distribution tray a pre-distribution tray. Suitably, the pre-distribution tray and the distribution tray are substantially parallel arranged with respect to each other.

Suitably, the pre-distribution tray is centrally arranged.

The pre-distribution tray may either have a substantially square or substantially circular cross-section.

Preferably, the pre-distribution tray has a substantially circular cross-section.

Suitably, the pre-distribution tray covers 10 to 50% of the cross-section of the reactor. Preferably, the pre-distribution tray covers 20 to 30% of the cross-section of the reactor.

Suitably, the guiding channels directing liquid downwardly to a central part of the mixing zone are uniformly and substantially annularly arranged around the compartment for receiving gas.

Preferably, the guiding channels comprise tubes of which the extremities are directed towards the vertical axis of the reactor.

Preferably, the extremities of the tubes debouch in a horizontal plane.

The compartment for receiving gas suitably comprises sidewalls and a roof which sidewalls extend upwardly from the collecting tray and are provided with a substantially annularly arranged opening or a series of openings for receiving gas. Suitably, the sidewalls of the compartment are cylindrical.

Preferably, the opening or series of openings for receiving the gas face(s) the openings in the device for injecting the additional gas and or liquid.

Preferably, the compartment for receiving gas comprises a swirling device to impart a swirling motion to the gas passing through the compartment in downwards direction to the mixing zone.

Suitably, the reactor in accordance with the present invention has an A/B ratio which ranges from 1 to 3, wherein A is defined as the distance between the collecting tray and the pre-distribution tray and wherein B is defined as the distance between the pre-distribution tray and the distribution tray. Suitably, the pre-distribution tray is provided with openings which may be uniformly arranged upon the pre-distribution tray.

The distribution tray comprises passages allowing liquid and gas to pass downwardly over an adjacent catalyst bed. Suitably, the passages comprise nozzles which are uniformly arranged upon the distribution tray.

In the context of the present invention the multi-bed downflow reactor is defined as a normally vertically extending substantially cylindrical vessel with one or more inlet means for a liquid and/or gas and fresh and/or regenerated catalyst, two or more catalyst beds, catalyst bed supporting means and and one or more outlet means for liquid and/or gas.

The present invention also relates a process for the catalytic conversion of a liquid and/or a gas, wherein use is made of a multi-bed downflow reactor as described hereinbefore.

An example of such a process is hydroprocessing, in particular hydrotreating and hydrocracking.

These processes are exothermic. Where the process of catalytic conversion of a liquid and/or a gas is endothermic, the additional liquid and/or gas for controlling the temperature in the reactor comprises a heating medium, for example steam, or a heated medium required for the catalytic conversion.

The additional liquid and/or gas may be a reactant, a product obtained in the process or an inert material.

Preferably, use is made of an additional gas, such as hydrogen, for controlling the temperature in the reactor.

VI. DETAILED DESCRIPTION OF THE DRAWINGS

The invention will now be illustrated by way of FIG. 1 which schematically shows a longitudinal cross-section of part of a multi-bed downflow reactor in accordance with the present invention.

In FIG. 1 a section of a multi-bed downflow reactor is depicted comprising a cylindrical side wall 1 enclosing a catalyst bed 2 and a catalyst bed 3. The catalyst bed 2 is supported by a catalyst bed support 4 such as a grid covered with screening on which a layer of ceramic balls can be arranged. Between catalyst beds 2 and 3 a quenching chamber is arranged. The quenching chamber comprises a ring 5 for injecting a quenching gas into the quenching chamber, a collecting tray 6 provided with guiding channels 7 which are uniformly and annularly arranged around a compartment 8 which is centrally arranged upon the collecting tray 6, a mixing zone 9, and a distribution tray 10. The distribution tray 10 is provided with nozzles 11. The compartment 8 comprises cylindrical sidewalls 12 and a roof 13 which sidewalls extend upwardly from the collecting tray 6 and are provided with annularly arranged openings 14. In the mixing zone 9 a pre-distribution tray 15 is arranged between the collecting tray 6 and the distribution tray 10.

During operation of the reactor liquid reactant and gaseous reactant from catalyst bed 2 enter the quenching chamber by passing through the catalyst bed support 4. A quenching gas is injected in the quenching chamber by means of ring 5. The gaseous reactant and the quenching gas enter the mixing zone by passing downwardly through the openings 14 of the compartment 8. Liquid reactant is collected on collecting tray 6 and the liquid reactant is directed by means of the guiding channels 7 to a central part of the mixing zone 9 after which it is collected on the pre-distribution tray 15 and uniformly distributed over distribution tray 10. Subsequently, gaseous and liquid fractions are distributed over catalyst bed 3 by means of nozzles 11.

What is claimed is:

1. A multi-bed downflow reactor for the catalytic conversion of a liquid and/or a gas comprising a chamber arranged between adjacent catalyst beds, which chamber comprises a) at least one device situated substantially annularly along the inner wall of said reactor comprising a series of openings for injecting an additional liquid and/or gas for controlling the temperature in the reactor, b) a collecting tray for receiving liquid, c) a centrally arranged compartment for receiving gas situated on said tray comprising side walls extending upwardly from the tray and containing substantially annular openings or series of openings for receiving gas, a roof interconnecting the side walls, and a swirl device to impart a swirling motion to gas passing therethrough to the mixing zone of element d)

d) a mixing zone for mixing liquid and gas, e) a distribution tray substantially parallel to said collecting tray comprising passages allowing liquid and gas to pass downwardly over an adjacent catalyst bed, whereby the collecting tray is arranged downstream of the device(s) for injecting the additional liquid and/or gas and comprises guiding channels directing liquid downwardly into a central part of the mixing zone, wherein the compartment is arranged upon the collecting tray and comprises at least one passage allowing gas to pass downwardly, and wherein the mixing zone is arranged between the collecting tray and the distribution tray; and f) a centrally located pre-distribution tray located substantially parallel to said distribution tray wherein the distance between the collecting tray and pre-distribution tray and the distance between the pre-distribution tray and distribution tray ranges from a ratio of 1 to 3.

2. The reactor according to claim 1, wherein the sidewalls are cylindrical.

3. The reactor according to claim 1, wherein the opening or series of openings in the compartment side walls face(s) the openings in the device of element a) for injecting the additional liquid and/or gas.

* * * * *